(12) United States Patent
Liu et al.

(10) Patent No.: US 11,513,913 B2
(45) Date of Patent: Nov. 29, 2022

(54) METHOD FOR STORAGE MANAGEMENT, ELECTRONIC DEVICE, AND COMPUTER PROGRAM PRODUCT

(71) Applicant: EMC IP Holding Company LLC, Hopkinton, MA (US)

(72) Inventors: Qin Liu, Chengdu (CN); Lanjun Liao, Chengdu (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 17/120,737

(22) Filed: Dec. 14, 2020

(65) Prior Publication Data

US 2022/0138050 A1 May 5, 2022

(30) Foreign Application Priority Data

Oct. 30, 2020 (CN) .......................... 202011194832.3

(51) Int. Cl.
G06F 7/00 (2006.01)
G06F 17/00 (2019.01)
G06F 11/14 (2006.01)
G06F 16/13 (2019.01)

(52) U.S. Cl.
CPC ...... *G06F 11/1464* (2013.01); *G06F 11/1469* (2013.01); *G06F 16/137* (2019.01); *G06F 2201/805* (2013.01)

(58) Field of Classification Search
None
See application file for complete search history.

(56) References Cited

U.S. PATENT DOCUMENTS

| 9,996,429 B1* | 6/2018 | Kumar | G06F 11/1448 |
| 2015/0178169 A1* | 6/2015 | Wertheimer | G06F 11/1453 707/685 |
| 2016/0110262 A1* | 4/2016 | Nanivadekar | G06F 13/4282 707/654 |
| 2019/0325043 A1* | 10/2019 | Liao | G06F 16/1748 |

* cited by examiner

*Primary Examiner* — Tuan A Pham
(74) *Attorney, Agent, or Firm* — Womble Bond Dickinson (US) LLP

(57) ABSTRACT

Embodiments of the present disclosure relate to a method for storage management, an electronic device, and a computer program product. According to an exemplary implementation of the present disclosure, a method for storage management includes: generating, at a client, a first backup block for recovering first target data, the client backing up the first target data to a first server and backing up metadata of the first target data to a second server, and the client together with at least one other client and the second server maintaining the same backup chain which includes at least one backup block; adding the first backup block to the backup chain maintained by the client; and distributing the first backup block to the at least one other client and the second server to add the first backup block to the backup chain maintained by the at least one other client and the second server. Therefore, the storage security can be improved.

21 Claims, 5 Drawing Sheets

METHOD FOR STORAGE MANAGEMENT, ELECTRONIC DEVICE, AND COMPUTER PROGRAM PRODUCT

CROSS-REFERENCE TO RELATED APPLICATION

This patent application claims priority, under 35 U.S.C. § 119, of Chinese Patent Application No. 202011194832.3, filed Oct. 30, 2020, which is incorporated by reference in its entirety.

TECHNICAL FIELD

Embodiments of the present disclosure relate generally to storage management, and in particular, to a method for storage management, an electronic device, and a computer program product.

BACKGROUND

With the development of storage technologies, more and more data is backed up into storage systems to avoid data loss. In this case, the requirements for the security of the storage systems are getting higher and higher. However, traditional data backup methods have various security problems. For example, backup data stored in the storage systems may be tampered with, or a client may be directed to a fake storage server to obtain fake backup data. Therefore, the traditional data backup methods are not secure.

SUMMARY OF THE INVENTION

Embodiments of the present disclosure provide a method for storage management, an electronic device, and a computer program product.

In a first aspect of the present disclosure, a method for storage management is provided. The method includes: generating, at a client, a first backup block for recovering first target data, the client backing up the first target data to a first server and backing up metadata of the first target data to a second server, and the client together with at least one other client and the second server maintaining the same backup chain which includes at least one backup block; adding the first backup block to the backup chain maintained by the client; and distributing the first backup block to the at least one other client and the second server to add the first backup block to the backup chain maintained by the at least one other client and the second server.

In a second aspect of the present disclosure, an electronic device is provided. The device includes at least one processing unit and at least one memory. The at least one memory is coupled to the at least one processing unit and stores instructions for execution by the at least one processing unit. The instructions, when executed by the at least one processing unit, causes the device to perform actions, and the actions include: generating, at a client, a first backup block for recovering first target data, the client backing up the first target data to a first server and backing up metadata of the first target data to a second server, and the client together with at least one other client and the second server maintaining the same backup chain which includes at least one backup block; adding the first backup block to the backup chain maintained by the client; and distributing the first backup block to the at least one other client and the second server to add the first backup block to the backup chain maintained by the at least one other client and the second server.

In a third aspect of the present disclosure, a computer program product is provided. The computer program product is tangibly stored on a non-transitory computer-readable medium and includes machine-executable instructions; and the machine-executable instructions, when executed, cause a machine to perform any step of the method described according to the first aspect of the present disclosure.

The summary part is provided in order to introduce the selection of concepts in a simplified form, which will be further described in the detailed description below. The summary part is intended to neither identify key features or essential features of the present disclosure, nor limit the scope of the present disclosure.

BRIEF DESCRIPTION OF THE DRAWINGS

The above and other objectives, features, and advantages of the present disclosure will become more apparent by describing the example embodiments of the present disclosure in more detail in combination with the accompanying drawings. In the example embodiments of the present disclosure, the same reference numerals generally represent the same parts.

In each accompanying drawing, the same or corresponding numerals represent the same or corresponding parts.

DETAILED DESCRIPTION

Figure 1:
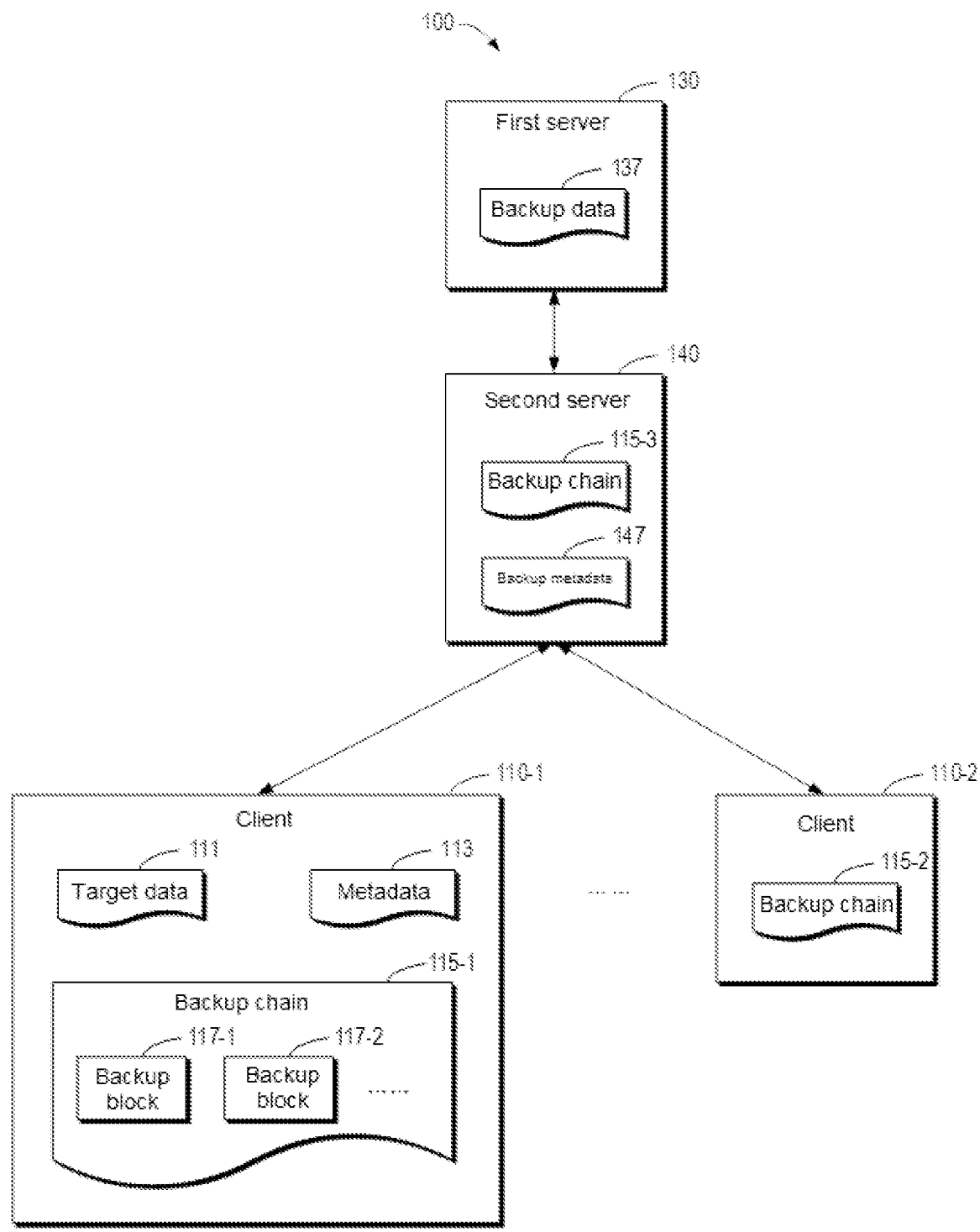
FIG. 1 is a schematic diagram of an example of a storage system in which some embodiments of the present disclosure can be implemented.

Hereinafter, preferred embodiments of the present disclosure will be described in more detail with reference to the accompanying drawings. Although the preferred embodiments of the present disclosure are shown in the drawings, it should be understood that the present disclosure can be implemented in various forms and should not be limited by the embodiments set forth herein. Rather, these embodiments are provided so that the present disclosure will be more thorough and complete, and will fully convey the scope of the present disclosure to those skilled in the art.

As used herein, the term "including" and variations thereof mean open-ended inclusion, that is, "including but not limited to." Unless specifically stated, the term "or" means "and/or." The term "based on" means "based at least in part on." The terms "one example embodiment" and "one embodiment" mean "at least one example embodiment." The term "another embodiment" means "at least one further embodiment." The terms "first," "second," and the like, may refer to different or the same objects. Other explicit and implicit definitions may also be included below.

As mentioned above, with the development of storage technology, more and more data is backed up into storage systems to avoid data loss. For example, with the development of cloud storage technology, more and more users tend to store mass data in a cloud. Compared with private storage, cloud storage is lower in cost and easier to extend.

However, since traditional storage systems are usually based on internal network designs without considering the security protection in a cloud environment, a storage server located in a cloud will create potential security risks. For example, when accessing a cloud, a client may be connected to a fake storage server (for example, rebinding attack through a DNS (Domain Name System)) for backup and restoration. In this case, the client will use fake backup data provided by the storage server to perform restoration, and thus there is a risk of data on the client being tampered with or attacked.

According to an example embodiment of the present disclosure, an improved solution for storage management is provided. In this solution, a backup block for recovering target data is generated at a client. The client backs up the target data to a first server and backs up metadata of the target data to a second server. The client together with at least one other client and a second server maintains the same backup chain including at least one backup block. The backup block is added into the backup chain maintained by the client, and the backup block is distributed to the at least one other client and the second server for being added into the backup chain maintained by the at least one other client and the second server.

In this way, in this solution, the backup block is maintained in a backup chain that is jointly maintained by a plurality of clients and the second server and may not be tampered with, thereby ensuring that the backup block may not be tampered with. Such a backup block may be used to verify the consistency between the backup data and the target data during the recovery of the target data, thereby improving the storage security and reliability. The embodiments of the present disclosure will be specifically described below with reference to the accompanying drawings.

FIG. 1 is a schematic diagram of an example of storage system 100 in which some embodiments of the present disclosure can be implemented. Storage system 100 includes a plurality of clients (for example, clients 110-1 and 110-2, hereinafter collectively referred to as "client 110"), first server 130, and second server 140. The clients and the servers may be implemented as one or more computing devices, which at least include a processor, a memory, and other components usually present in a general-purpose computer, so as to implement functions such as computing, storage, communication, and control. For example, the clients and the servers may be a personal computer, a tablet computer, a wearable device, a mainframe, a distributed computing system, and the like. It should be understood that although only two clients 110 and 120 are shown in FIG. 1, the number of clients may be more or less.

Client 110 may back up the target data stored thereon to the servers. For example, client 110-1 may back up target data 111 to first server 130, thereby storing backup data 137 as a copy of target data 111 in first server 130. In addition, client 110-1 may also back up metadata 113 of target data 111 to second server 140, thereby storing backup metadata 147 as a copy of metadata 113 in second server 140.

In some embodiments, first server 130 may be a remote storage server, for example, a storage server located in the cloud. Second server 140 may be a local storage server. Backing up metadata 147 locally, on the one hand, can improve the security of the metadata. On the other hand, due to the small size of the metadata, only the metadata is backed up locally, and the target data is backed up to the cloud with lower cost, which can reduce the storage cost.

In addition, client 110 and second server 140 may implement a blockchain called a backup chain, for example, backup chains 115-1 to 115-3 (hereinafter, collectively referred to as "backup chain 115"). Backup chain 115 may include a plurality of backup blocks. For example, backup chain 115-1 may include backup blocks 117-1 and 117-2 (hereinafter, collectively referred to as "backup block 117"). One backup block 117 may correspond to one backup. In other words, client 110 may generate one backup block 117 when performing backup once. Backup block 117 may be used to verify backup data 137 when recovering target data 111 to ensure the consistency between target data 111 and backup data 137. It should be understood that although FIG. 1 only shows that backup chain 115-1 includes two backup blocks 117-1 and 117-2, the number of backup blocks 117 in backup chain 115 may be more or less.

In order to realize backup chain 115, a connection, such as a peer-to-peer connection, may be established between client 110 and second server 140. Backup chain 115 is decentralized, so client 110 and second server 140 that maintain backup chain 115 are both equal nodes. By means of a consensus mechanism, client 110 and second server 140 may maintain the same backup chain 115. Such backup chain 115 cannot be tampered with, thereby ensuring that backup block 117 in backup chain 115 cannot be tampered with. Furthermore, since backup chain 115 is maintained by local client 110 and second server 140, the security and reliability of backup chain 115 are further ensured.

As described above, backup chain 115 is composed of backup block 117, and backup block 117 is generated when client 110 performs a backup. For example, when client 110-1 backs up target data 111, backup block 117-2 for recovering target data 111 may be generated. Client 110-1 may add backup block 117-2 to backup chain 115-1 maintained by client 110-1. In addition, client 110-1 may distribute backup block 117-2 to at least one other client (for example client 110-2) and second server 140 to add the backup block to the backup chain (for example backup chains 115-2 and 115-3) maintained by the at least one other client and second server 140. In this way, during recovery of target data 111, client 110 may use backup block 117-2 to ensure that backup data 137 is consistent with target data 111, and to prevent the data on client 110 from being tampered with or attacked, thereby improving the storage security and reliability.

Figure 2:
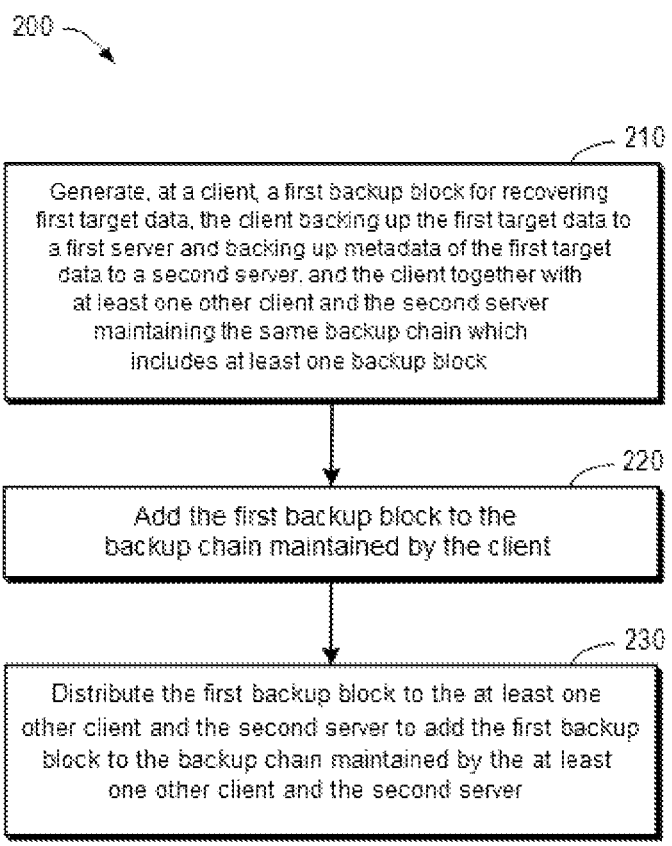
FIG. 2 is a flowchart of an example of a method for storage management according to some embodiments of the present disclosure.

FIG. 2 is a flowchart of method 200 for storage management according to some embodiments of the present disclosure. Method 200 may be implemented by client 110 as shown in FIG. 1. Alternatively, method 200 may also be implemented by other subjects besides client 110. It should be understood that method 200 may further include additional steps that are not shown and/or may omit the shown steps, and the scope of the present disclosure is not limited in this aspect.

At 210, client 110 (for example, client 110-1) generates a backup block (for example, backup block 117-2) for recovering the target data (for example, target data 111). Client 110-1 together with at least one other client (for example, client 110-2) and second server 140 maintains the same backup chain 115 including at least one backup block 117. Client 110-1 backs up target data 111 to first server 130, and backs up metadata 113 of target data 111 to second server 140.

In some embodiments, client 110-1 may divide target data 111 into a plurality of data fragments, and store these data fragments and their respective hash values in first server 130. In addition, client 110-1 may also store metadata 113 of target data 111 and a hash value of metadata 113 in second server 140. In this way, source deduplication may be achieved. The source deduplication may have several advantages. Specifically, for repeated data fragments, the client only needs to send the hash values of the data fragments to the storage server, without sending the data fragments themselves, which can significantly reduce the network traffic used in the backup process and improve the backup efficiency. In addition, since the same data fragments have only one copy in the storage server, the storage space may be saved.

Figure 3:
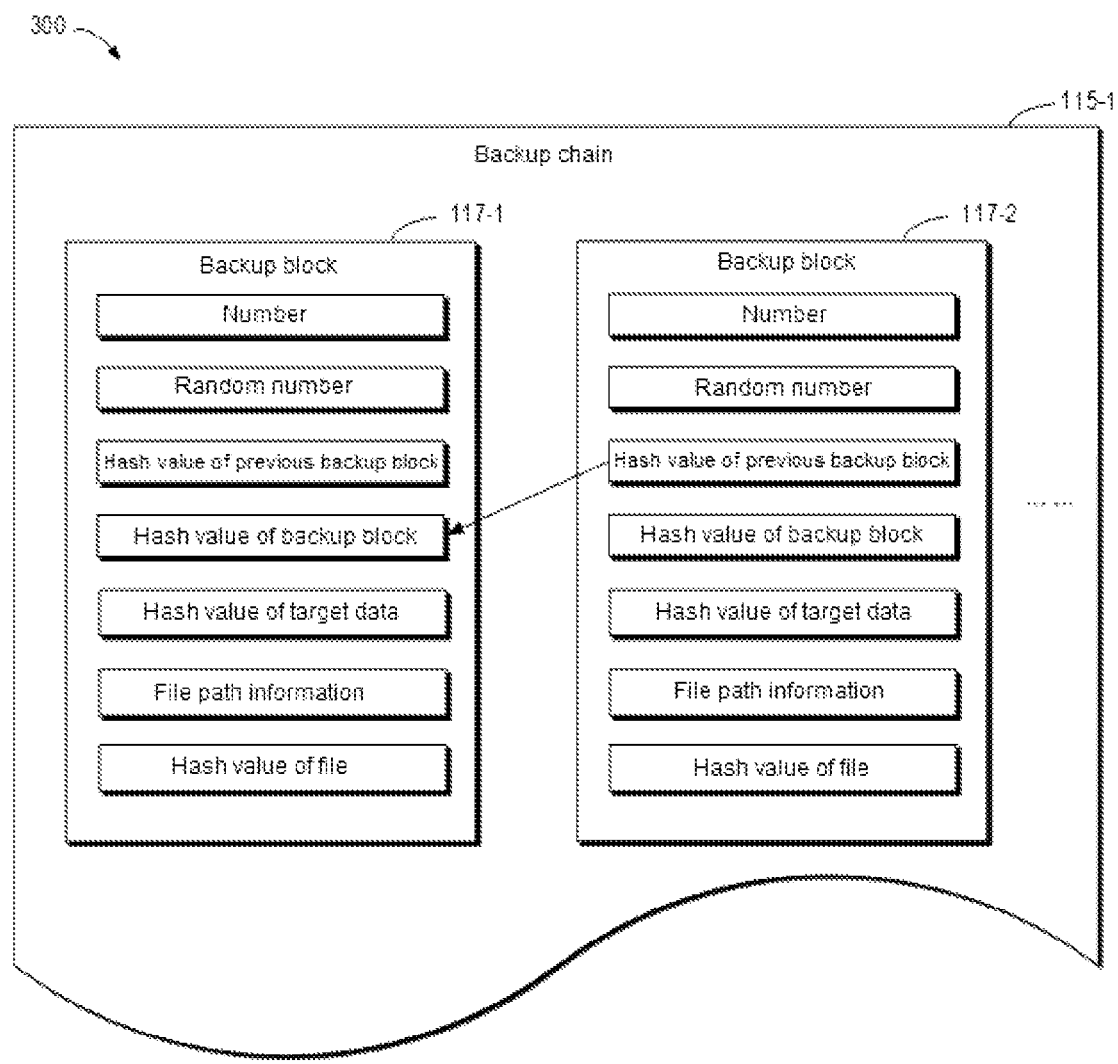
FIG. 3 is a schematic diagram of an example of a backup block according to some embodiments of the present disclosure.

FIG. 3 is schematic diagram 300 of an example of a backup block according to some embodiments of the present disclosure. In the following text, backup blocks 117-1 and 117-2 in backup chain 115-1 will be used as examples of backup blocks for description.

Backup block 117 may include the number of backup block 117 in backup chain 115, a random value, a hash value of a backup block located in front of backup block 117 in backup chain 115, and/or a hash value of backup block 117. In some embodiments, the random value may be a randomly generated value that is unique to each backup block 117. In addition, since backup block 117 includes the hash value of the previous backup block, the previous backup block may be found through one backup block, so that the backup block forms localizable backup chain 115. For example, since backup block 117-2 includes the hash value of previous backup block 117-1, backup block 117-1 may be located through backup block 117-2. In some embodiments, since there is no other backup blocks in front of the first backup block (for example, backup block 117-1) of backup chain 115, the hash value of the backup block in front of it may be set to a predetermined value (for example, empty).

Further, backup block 117 may also include the hash value of target data 111, file path information for target data 111, and the respective hash value of at least one file in target data 110. In some embodiments, the file path information may indicate a storage path of the at least one file in target data 110 on client 110.

Referring back to FIG. 2, at 220, client 110-1 adds backup block 117-2 to backup chain 115-1 maintained by client 110-1. At 230, client 110-1 distributes backup block 117-2 to at least one other client and second server 140 to add the backup block to backup chain 115 maintained by the at least one other client and second server 140.

In addition to adding backup block 117, client 110 may also delete backup block 117. In some embodiments, if client 110 determines that a request for deleting backup block 117 is received, client 110 may delete backup block 117 from backup chain 115 maintained thereby. In addition, client 110 may also send a request for deleting backup block 117 from backup chain 115 maintained by at least one other client and second server 140 to these clients and second server 140. Further, when the backup block is deleted from the backup chain, the subsequent one backup block will become connected to or refer to the previous one backup block. Therefore, the hash value, included in the subsequent one backup block, of the previous one backup block will also change from the hash value of the deleted backup block to the hash value of the previous one backup block.

In some embodiments, for security purposes, backup block 117 is allowed to be added and deleted only, and the backup block 117 is not allowed to be modified, thereby preventing malicious third parties from damaging backup block 117.

In this way, when secure backup block 117 is used to recover target data 111, it may be ensured that backup data 137 is consistent with target data 111, thereby preventing client 110 from being tampered with or attacked, and improving the storage security and reliability.

Figure 4:
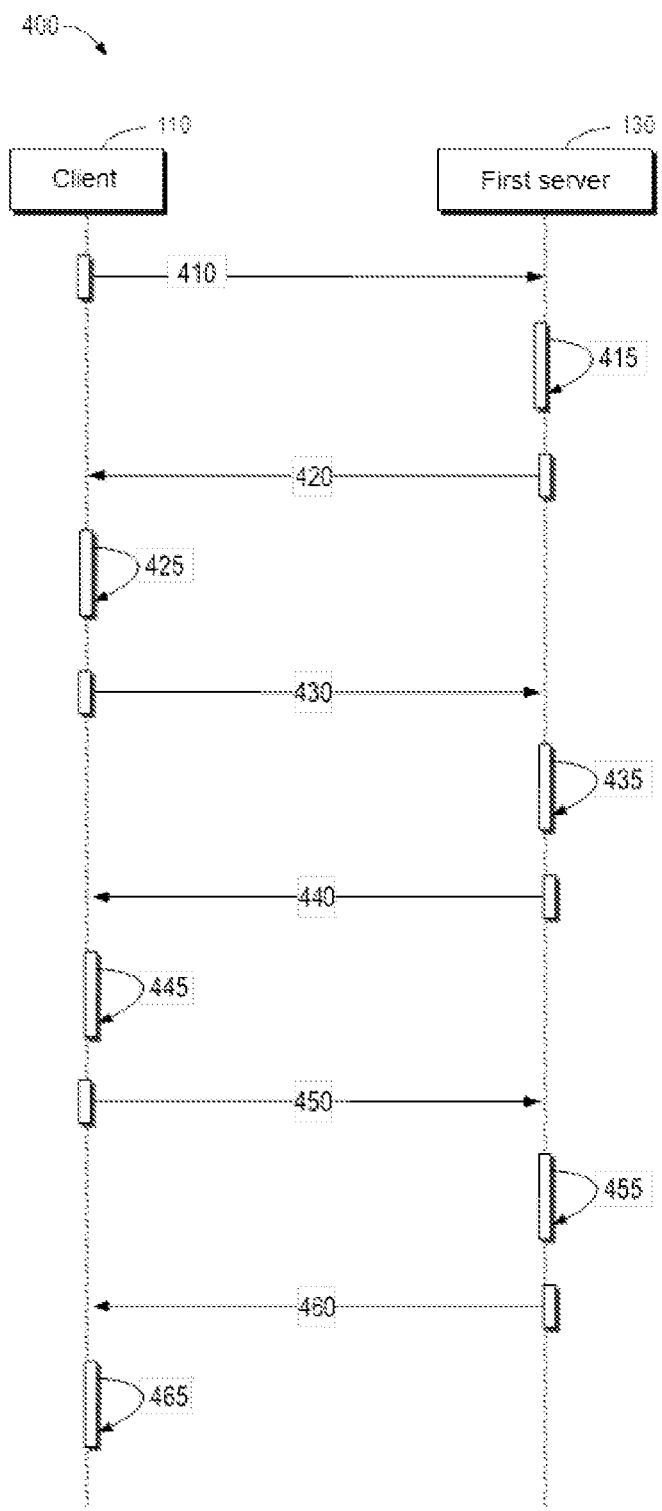
FIG. 4 is a swimlane diagram of an example of a data recovery process according to some embodiments of the present disclosure.

The generation process of the backup block is described above, and the process of using the backup block to recover the target data will be described below with reference to FIG. 4. FIG. 4 is a swimlane diagram of an example of data recovery process 400 according to some embodiments of the present disclosure. Process 400 may be implemented by client 110 and first server 130 as shown in FIG. 1. Alternatively, process 400 may also be implemented by other subjects apart from client 110 and first server 130. It should be understood that process 400 may also include additional steps not shown and/or may omit the steps shown, and that the scope of the present disclosure is not limited in this respect.

Client 110 (for example, client 110-1) may send a recovery request for target data 111 to first server 130 at 410. It should be understood that target data 111 is only an example of data to be recovered, and client 110 may recover any target data that has been backed up. After receiving a recovery request, first server 130 may determine, based on the recovery request, backup data 137 stored on first server 130 and corresponding to target data 111 at 415. Then, first server 130 may determine the hash value of backup data 137 and send the hash value of backup data 137 to client 110 at 420.

Client 110 may receive a hash value of backup data 137 from first server 130, and select, based on the hash value of backup data 137, backup blocks (for example, backup block 117-2) from backup chain 117 at 425, wherein a hash value of target data 111 included in backup block 117-2 matches the hash value of backup data 137.

Client 110 may acquire, based on backup block 117-2, backup data 137 for target data 111 from first server 130. Thus, client 110 may recover target data 111 based on backup data 137. In some embodiments, target data 111 may include a target file to be recovered. In this case, in order to acquire backup data 137, client 110 may extract a storage path of the target file on client 110 from backup block 117-2, and send information indicating the storage path to first server 130 at 430.

After receiving the information indicating the storage path, first server 130 may determine, based on the storage path, a backup file of the target file stored on first server 130 and corresponding to the storage path at 435. Then, first server 130 may determine a hash value of the backup file, and send the hash value of the backup file to client 110 at 440.

Client 110 may receive the hash value of the backup file from first server 130 and determine whether the received hash value of the backup file matches the hash value of the target file included in backup block 117 at 445. If the received hash value of the backup file matches the hash value of the target file included in backup block 117, client 110 may send a file recovery request to first server 130 at 450.

After receiving the file recovery request, first server 130 may determine, based on the file recovery request, the backup file to be recovered at 455, and send the backup file to client 110 at 460. After receiving the backup file from first server 130, client 110 may use the backup file to recover the target file at 465.

In some embodiments, client 110 may also further verify the recovered target file. For example, client 110 may generate a hash value of the recovered target file, and determine whether the hash value of the recovered target file matches the hash value of the target file included in backup block 170. If the hash value of the recovered target file matches the hash value of the target file included in backup block 117, client 110 may determine that the target file is recovered successfully.

In this way, since the secure backup block is used for verification during the data recovery, it can be ensured that the recovered data has not been tampered with, thereby improving the storage security and reliability.

Figure 5:
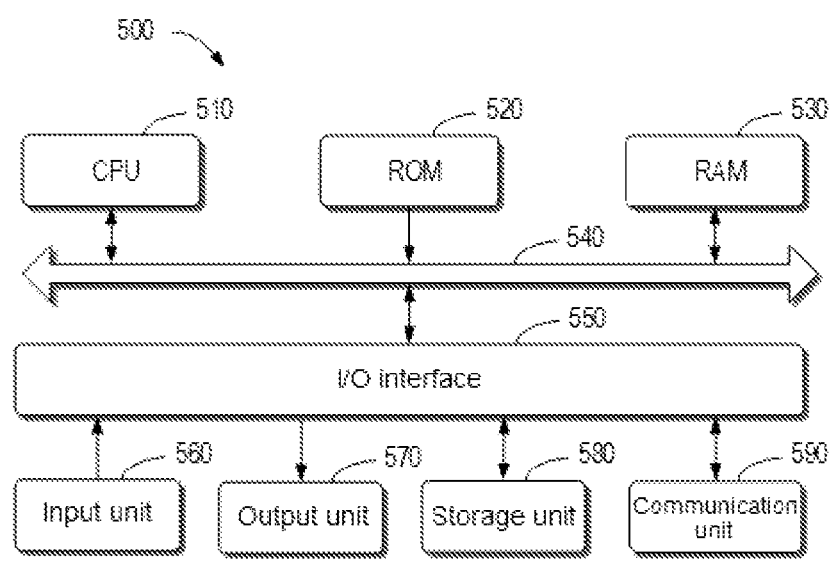
FIG. 5 is a schematic block diagram of an example device that can be used to implement embodiments of the present disclosure.

FIG. 5 is a schematic block diagram of example device 500 that can be configured to implement an embodiment of the present disclosure. For example, client 110, first server 130, and second server 140 as shown in FIG. 1 may be implemented by device 500. As shown in the figure, device 500 includes central processing unit (CPU) 510 that may perform various appropriate actions and processes according to computer program instructions stored in read only memory (ROM) 520 or computer program instructions loaded from storage unit 580 to random access memory (RAM) 530. In RAM 530, various programs and data required for the operation of device 500 may also be stored. CPU 510, ROM 520, and RAM 530 are connected to each other through bus 540. Input/output (I/O) interface 550 is also connected to bus 540.

Multiple components in device 500 are connected to I/O interface 550, including: input unit 560, such as a keyboard or a mouse; output unit 570, such as various types of displays or speakers; storage unit 580, such as a magnetic disk or an optical disk; and communication unit 590, such as a network card, a modem, or a wireless communication transceiver. Communication unit 590 allows device 500 to exchange information/data with other devices over a computer network such as the Internet and/or various telecommunication networks.

The various processes and processing described above, for example, processes 200 and 400, may be performed by processing unit 510. For example, in some embodiments, processes 200 and 400 may be implemented as a computer software program that is tangibly included in a machine-readable medium, for example, storage unit 580. In some embodiments, some or all of the computer program may be loaded and/or installed onto device 500 via ROM 520 and/or communication unit 590. When the computer program is loaded into RAM 530 and executed by CPU 510, one or more actions of processes 200 and 400 described above may be implemented.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device that can hold and store instructions used by an instruction execution device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of computer-readable storage media include: a portable computer disk, a hard disk, a random access memory (RAM), a read-only memory (ROM), an erasable programmable read-only memory (EPROM or a flash memory), a static random access memory (SRAM), a portable compact disc read-only memory (CD-ROM), a digital versatile disc (DVD), a memory stick, a floppy disk, a mechanical encoding device (for example, a punch card or a raised structure in a groove with instructions stored thereon), and any suitable combination of the foregoing. Computer-readable storage media used herein are not to be interpreted as transient signals per se, such as radio waves or other freely propagating electromagnetic waves, electromagnetic waves propagating through waveguides or other transmission media (for example, light pulses through fiber optic cables), or electrical signal transmitted via electrical wires.

The computer-readable program instructions described herein can be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives a computer-readable program instruction from the network and forwards the computer-readable program instruction for storage in the computer-readable storage medium in each computing/processing device.

The computer program instructions for performing the operations of the present disclosure may be assembly instructions, instruction set architecture (ISA) instructions, machine instructions, machine-related instructions, microcode, firmware instructions, status setting data, or source code or object code written in any combination of one or more programming languages, including object-oriented programming languages, such as Java, Smalltalk, and C++, as well as conventional procedural programming languages, such as "C" language or similar programming languages. The computer-readable program instructions may be executed entirely on a user computer, executed partly on a user computer, executed as a stand-alone software package, executed partly on a user computer while executed partly on a remote computer, or executed entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), can be customized by utilizing status information of the computer-readable program instructions. The electronic circuit may execute the computer-readable program instructions to implement various aspects of the present disclosure.

Various aspects of the present disclosure are described herein with reference to flowcharts and/or block diagrams of the method, the apparatus (system), and the computer program product according to embodiments of the present disclosure. It should be understood that each block in the flowcharts and/or block diagrams and a combination of blocks in the flowcharts and/or block diagrams may be implemented by computer-readable program instructions.

The computer-readable program instructions may be provided to a processing unit of a general purpose computer, a special purpose computer, or another programmable data processing apparatus to produce a machine, such that the instructions, when executed by the processing unit of the computer or another programmable data processing apparatus, generate an apparatus for implementing the functions/actions specified in one or more blocks in the flowcharts and/or block diagrams. These computer-readable program instructions may also be stored in a computer-readable storage medium, and these instructions cause a computer, a programmable data processing apparatus, and/or other devices to work in a specific manner; and thus the computer-readable medium having stored instructions includes an article of manufacture including instructions that implement various aspects of the functions/actions specified in one or more blocks in the flowcharts and/or block diagrams.

The computer-readable program instructions can also be loaded onto a computer, a further programmable data processing apparatus, or a further device, so that a series of operating steps can be performed on the computer, the further programmable data processing apparatus, or the further device to produce a computer-implemented process, such that the instructions executed on the computer, the further programmable data processing apparatus, or the further device can implement the functions/actions specified in one or more blocks in the flowcharts and/or block diagrams.

The flowcharts and block diagrams in the drawings illustrate the architectures, functions, and operations of possible implementations of the systems, methods, and computer program products according to a plurality of embodiments of the present disclosure. In this regard, each block in the flowcharts or block diagrams may represent a module, a program segment, or part of an instruction, the module, the program segment, or the part of an instruction including one or more executable instructions for implementing specified logical functions. In some alternative implementations, the functions marked in the blocks may also occur in an order different from that marked in the accompanying drawings. For example, two successive blocks may actually be executed in parallel substantially, or they may be executed in an opposite order sometimes, depending on the functions involved. It should be further noted that each block in the block diagrams and/or flowcharts as well as a combination of blocks in the block diagrams and/or flowcharts may be implemented by using a special hardware-based system for executing specified functions or actions or by a combination of special hardware and computer instructions.

The embodiments of the present disclosure have been described above. The above description is illustrative, rather than exhaustive, and is not limited to the disclosed embodiments. Numerous modifications and changes are apparent to those of ordinary skill in the art without departing from the scope and spirit of the various illustrated embodiments. The selection of terms as used herein is intended to best explain the principles and practical applications of the various embodiments or technical improvements to technologies on the market, or to enable other persons of ordinary skill in the art to understand the various embodiments disclosed herein.

The invention claimed is:

1. A method for storage management, comprising:
generating, at a client, a first backup block for recovering first target data, the client backing up the first target data to a first storage server and backing up metadata of the first target data to a second storage server, and the client together with at least one other client and the second storage server maintaining the same backup chain which comprises at least one backup block;
adding the first backup block to the backup chain maintained by the client; and
distributing the first backup block to the at least one other client and the second storage server to add the first backup block to the backup chain maintained by the at least one other client and the second storage server, wherein the first backup block comprises a hash value of the backup block located in front of the first backup block in the backup chain.

2. The method according to claim 1, wherein the first backup block comprises at least one of the following:
the number of the first backup block in the backup chain,
a random value,
a hash value of the first backup block,
a hash value of the first target data,
file path information for the first target data, the file path information indicating a storage path of at least one file in the first target data on the client, and
a hash value of each of the at least one file.

3. The method according to claim 1, further comprising:
dividing the first target data into a plurality of data fragments;
storing the plurality of data fragments and respective hash values of the plurality of data fragments into the first storage server; and
storing the metadata of the first target data and a hash value of the metadata into the second storage server.

4. The method according to claim 1, further comprising:
if it is determined that a request for deleting the first backup block is received, deleting the first backup block from the backup chain maintained by the client; and
sending a request for deleting the first backup block from the backup chain maintained by the at least one other client and the second storage server to the at least one other client and the second storage server.

5. The method according to claim 1, further comprising:
sending a recovery request for second target data to the first storage server;
receiving a hash value of backup data for the second target data from the first storage server;
selecting, based on the received hash value of the backup data, a second backup block from the backup chain, a hash value of the second target data comprised in the second backup block matching the received hash value of the backup data;
acquiring, based on the second backup block, the backup data for the second target data from the first storage server; and
recovering, based on the backup data, the second target data.

6. The method according to claim 5, wherein the second target data comprises a target file to be recovered, and acquiring the backup data comprises:
extracting a storage path of the target file on the client from the second backup block;
sending information indicating the storage path to the first storage server;
receiving a hash value of a backup file for the target file from the first storage server;
if it is determined that the received hash value of the backup file matches a hash value of the target file comprised in the second backup block, sending a file recovery request to the first storage server; and
receiving the backup file from the first storage server.

7. The method according to claim 6, further comprising:
generating a hash value of the recovered target file;
determining whether the hash value of the recovered target file matches the hash value of the target file comprised in the second backup block, and
if the hash value of the recovered target file matches the hash value of the target file comprised in the second backup block, determining that the target file is recovered successfully.

8. An electronic device, comprising:
at least one processing unit; and
at least one memory coupled to the at least one processing unit and storing instructions, which when executed by the at least one processing unit, cause the device to perform actions, the actions comprising:
generating, at a client, a first backup block for recovering first target data, the client backing up the first target data to a first storage server and backing up metadata of the first target data to a second storage server, and the client together with at least one other client and the second storage server maintaining the same backup chain which comprises at least one backup block;
adding the first backup block to the backup chain maintained by the client; and
distributing the first backup block to the at least one other client and the second storage server to add the first backup block to the backup chain maintained by the at least one other client and the second storage server, wherein the first backup block comprises a hash value of the backup block located in front of the first backup block in the backup chain.

9. The device according to claim 8, wherein the first backup block comprises at least one of the following:
the number of the first backup block in the backup chain,
a random value,
a hash value of the first backup block,
a hash value of the first target data,
file path information for the first target data, the file path information indicating a storage path of at least one file in the first target data on the client, and
a hash value of each of the at least one file.

10. The device according to claim 8, wherein the actions further comprise:
dividing the first target data into a plurality of data fragments;
storing the plurality of data fragments and respective hash values of the plurality of data fragments into the first storage server; and
storing the metadata of the first target data and a hash value of the metadata into the second storage server.

11. The device according to claim 8, wherein the actions further comprise:
if it is determined that a request for deleting the first backup block is received, deleting the first backup block from the backup chain maintained by the client; and
sending a request for deleting the first backup block from the backup chain maintained by the at least one other client and the second storage server to the at least one other client and the second storage server.

12. The device according to claim 8, wherein the actions further comprise:
sending a recovery request for second target data to the first storage server;
receiving a hash value of backup data for the second target data from the first storage server;
selecting, based on the received hash value of the backup data, a second backup block from the backup chain, a hash value of the second target data comprised in the second backup block matching the received hash value of the backup data;
acquiring, based on the second backup block, the backup data for the second target data from the first storage server; and
recovering, based on the backup data, the second target data.

13. The device according to claim 12, wherein the second target data comprises a target file to be recovered, and acquiring the backup data comprises:
extracting a storage path of the target file on the client from the second backup block;
sending information indicating the storage path to the first storage server;
receiving a hash value of a backup file for the target file from the first storage server;
if it is determined that the received hash value of the backup file matches a hash value of the target file comprised in the second backup block, sending a file recovery request to the first storage server; and
receiving the backup file from the first storage server.

14. The device according to claim 13, wherein the actions further comprise:
generating a hash value of the recovered target file;
determining whether the hash value of the recovered target file matches the hash value of the target file comprised in the second backup block,
if the hash value of the recovered target file matches the hash value of the target file comprised in the second backup block, determining that the target file is recovered successfully.

15. A non-transitory computer-readable medium comprising machine-executable instructions, which when executed by a machine, cause the machine to perform actions, the actions comprising:
generating, at a client, a first backup block for recovering first target data, the client backing up the first target data to a first storage server and backing up metadata of the first target data to a second storage server, and the client together with at least one other client and the second storage server maintaining the same backup chain which comprises at least one backup block;
adding the first backup block to the backup chain maintained by the client; and
distributing the first backup block to the at least one other client and the second storage server to add the first backup block to the backup chain maintained by the at least one other client and the second storage server, wherein the first backup block comprises a hash value of the backup block located in front of the first backup block in the backup chain.

16. The computer-readable medium according to claim 15, wherein the first backup block comprises at least one of the following:
the number of the first backup block in the backup chain,
a random value,
a hash value of the first backup block,
a hash value of the first target data,
file path information for the first target data, the file path information indicating a storage path of at least one file in the first target data on the client, and
a hash value of each of the at least one file.

17. The computer-readable medium according to claim 15, wherein the actions further comprise:

dividing the first target data into a plurality of data fragments;

storing the plurality of data fragments and respective hash values of the plurality of data fragments into the first storage server; and storing the metadata of the first target data and a hash value of the metadata into the second storage server.

18. The computer-readable medium according to claim 15, wherein the actions further comprise:

if it is determined that a request for deleting the first backup block is received, deleting the first backup block from the backup chain maintained by the client; and sending a request for deleting the first backup block from the backup chain maintained by the at least one other client and the second storage server to the at least one other client and the second storage server.

19. The computer-readable medium according to claim 15, wherein the actions further comprise:

sending a recovery request for second target data to the first storage server;

receiving a hash value of backup data for the second target data from the first storage server;

selecting, based on the received hash value of the backup data, a second backup block from the backup chain, a hash value of the second target data comprised in the second backup block matching the received hash value of the backup data;

acquiring, based on the second backup block, the backup data for the second target data from the first storage server; and recovering, based on the backup data, the second target data.

20. The computer-readable medium according to claim 19, wherein the second target data comprises a target file to be recovered, and acquiring the backup data comprises:

extracting a storage path of the target file on the client from the second backup block;

sending information indicating the storage path to the first storage server;

receiving a hash value of a backup file for the target file from the first storage server;

if it is determined that the received hash value of the backup file matches a hash value of the target file comprised in the second backup block, sending a file recovery request to the first storage server; and receiving the backup file from the first storage server.

21. The computer-readable medium according to claim 20, wherein the actions further comprise:

generating a hash value of the recovered target file;

determining whether the hash value of the recovered target file matches the hash value of the target file comprised in the second backup block, and if the hash value of the recovered target file matches the hash value of the target file comprised in the second backup block, determining that the target file is recovered successfully.

\* \* \* \* \*